United States Patent
Johansson et al.

(12) 
(10) Patent No.: US 6,466,559 B1
(45) Date of Patent: *Oct. 15, 2002

(54) METHOD AND APPARATUS FOR ALLOCATING PROCESSING RESOURCES

(75) Inventors: Staffan E. Johansson, Luleå (SE); Nils T. E. Jonsson, Luleå (SE); Peter Johansson, Luleå (SE); Christoffer Andersson, Luleå (SE); Patrik J. E. Rynbäck, Luleå (SE)

(73) Assignee: Telefonaktiebolat LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/143,619

(22) Filed: Aug. 28, 1998

Related U.S. Application Data

(63) Continuation-in-part of application No. 09/069,168, filed on Apr. 29, 1998, now Pat. No. 6,333,936.

(51) Int. Cl.$^7$ ................................................. H04J 13/00
(52) U.S. Cl. ........................ 370/335; 370/320; 370/342; 370/395.3; 370/457; 370/465
(58) Field of Search ................................ 370/252, 320, 370/342, 422, 441, 449, 453, 457, 461, 462, 465, 479, 335, 395.3, 395.31, 395.32

(56) References Cited

U.S. PATENT DOCUMENTS

| | | | |
|---|---|---|---|
| 4,713,806 A | 12/1987 | Oberlander et al. | 370/58 |
| 5,257,387 A | * 10/1993 | Richek et al. | 395/800 |
| 5,713,075 A | 1/1998 | Threadgill et al. | 455/427 |
| 6,148,003 A | * 11/2000 | Van Dort | 370/462 |
| 6,163,544 A | * 12/2000 | Andersson et al. | 370/422 |

FOREIGN PATENT DOCUMENTS

| | | | |
|---|---|---|---|
| EP | 0 658 062 A | 6/1995 | H04Q/3/58 |

* cited by examiner

*Primary Examiner*—Douglas Olms
*Assistant Examiner*—Shick Hom
(74) *Attorney, Agent, or Firm*—Nixon & Vanderhye, P.C.

(57) ABSTRACT

First and second pools of resource units are configured using a structure having plural levels including first and second level resource units. A relationship is established between ones of the two pools of resource units. A request is made for a resource that requires a resource unit from both of the first and second resource unit pools. A single allocation procedure is employed to allocate resource units from both pools. If one of the resource units is available in one pool, the relationship ensures that a required corresponding resource unit in another pool is also available.

26 Claims, 10 Drawing Sheets

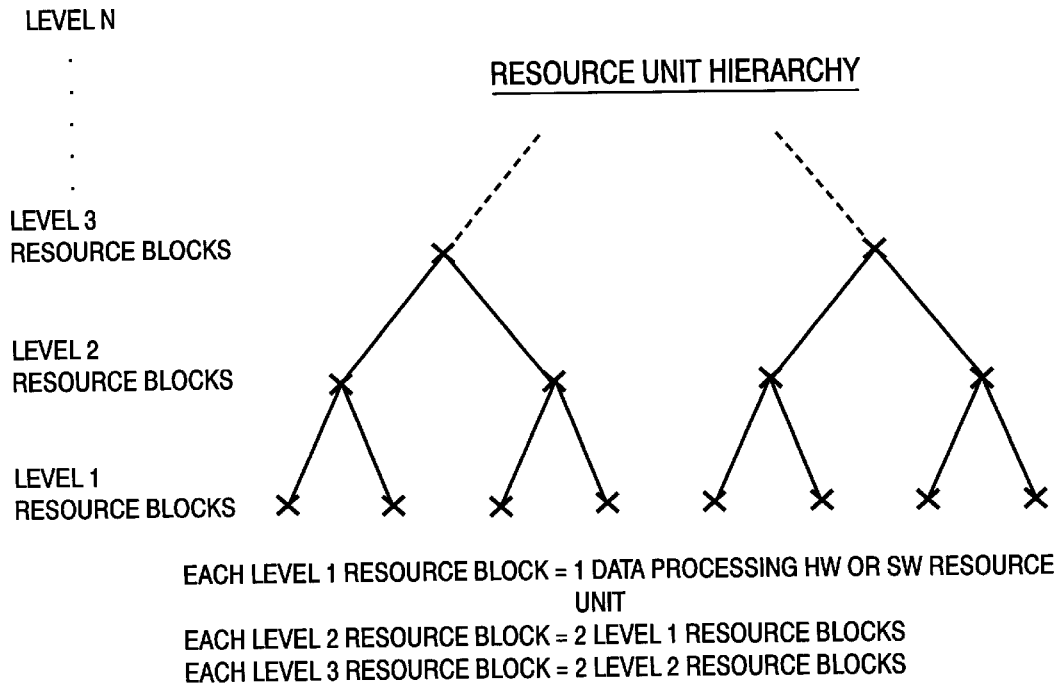
Fig. 1 *(Prior Art)*
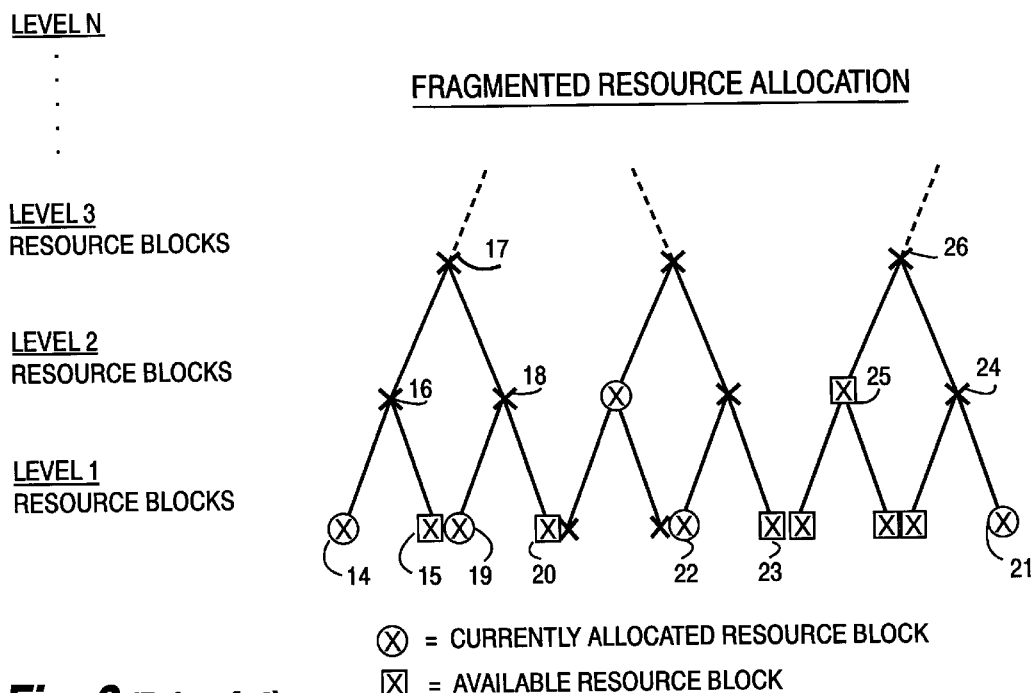
Fig. 2 *(Prior Art)*

EFFICIENT RESOURCE ALLOCATION

METHOD AND APPARATUS FOR ALLOCATING PROCESSING RESOURCES

RELATED APPLICATION

This is a continuation-in-part application of commonly assigned U.S. patent application Ser. No. 09/069,168, entitled "Method and Apparatus for Allocating Processing Resources," filed on Apr. 29, 1998 now U.S. Pat. No. 6,333,936.

FIELD OF THE INVENTION

The present invention relates to allocating resources in general, and more particularly, to allocating various data, signal, and/or communications processing resources.

BACKGROUND AND SUMMARY OF THE INVENTION

In certain environments, data, signal, and communication processing resources may be dedicated for use by particular hardware elements, software elements (e.g., application programs), and human operators, each of which may be generally viewed as a "resource user." While such resource dedication is convenient and also ensures that the necessary or otherwise appropriate resources are available whenever the resource user requests them, this one-to-one, dedicated relationship between a resource and a resource user is inefficient. This inefficiency is primarily due to the fact that dedicated resources are most often underutilized since the resource user typically uses its dedicated resource less than 100% of the time.

The present invention employs a more efficient resource allocation approach in which resources are pooled and allocated on an "as needed" basis. In other words, in response to a resource request, a resource (if available) is "withdrawn" from a pool of resources and provided to the requesting resource user. When the resource user is finished using that resource, it is returned to the resource pool. Efficiency is increased because (1) the number of resource users may be considerably larger than the number of resources in the pool and (2) resources are removed from the pool only when they are actually used.

In order for a pooled resource system to work smoothly, the allocation and return of resources from and to the resource pool needs to be managed in an effective and efficient manner. Efficient management is more challenging when the pool of resources as well as the resource requests are not all the same. For instance, one resource request may be for a relatively small resource while another resource request might be for a relatively large resource. Moreover, resource requests may also differ in parameters other than size.

The present invention resolves these issues in part by imposing a structure on the resource pool including specific rules regarding how resources are to be allocated from the pool. Those rules may vary depending on the end application that requests and uses the resources. One example (but non-limiting) structure is the resource hierarchy shown in FIG. 1. The hierarchy includes a plurality of levels or tiers with each level having plural nodes representing a resource block at that level. The data structure is organized in such a way that it "mirrors" the physical resources in terms of how those physical resources are linked or grouped. The physical resources are configured, reconfigured, allocated, de-allocated, organized, and re-organized using the data structure.

In general, a number of lower level resource units are grouped to form a corresponding, higher level resource unit. Level 1 resource blocks correspond as shown in FIG. 1 to one data processing resource unit, where a resource unit may comprise hardware and/or software. Each level 2 resource block corresponds to a group (in this example two) of consecutive level 1 resource blocks. Similarly, each level 3 resource block of the resource hierarchy corresponds to a group of consecutive level 2 resource blocks.

Thus, if a resource request requires four data processing resource units, a single level 3 resource block would be allocated to that request. A level 3 resource block corresponds, in this example, to two level 2 resource blocks which in turn corresponds to four level 1 resource blocks equivalent to the four data processing resource units.

While resources may be allocated from and returned to such a hierarchical structure in random fashion, such an approach may ultimately lead to inefficiencies. In particular, the initial, ordered structure of the resource hierarchy may become fragmented after several resource block allocations and returns. Unfortunately, because of the fragmentation, resource blocks at certain levels cannot be filly utilized. For example, FIG. 2 shows the resource hierarchy of FIG. 1 with a fragmented resource allocation configuration. Circled resource blocks correspond to a currently allocated resource block, and a square enclosing a resource block represents a currently-available resource block. Because level 1 resource block 14 is currently allocated, level 2 resource block 16, logically linked to both level 1 resource blocks 14 and 15, cannot be allocated. A "domino effect" occurs—since level 3 resource block 17 is linked to resource blocks 16 and 18, level 3 resource block 17 cannot be currently allocated even if level 2 resource block 18 were currently available.

On the other hand, if the currently-allocated resource block 19 had been allocated from currently-available resource block 15, the level resource block 18 would have been available for allocation. Similarly, if currently-allocated, level 1 resource block 21 was not allocated, and instead the currently-available level 1 resource block 23 was assigned to the resource request, the currently-unavailable level 2 resource block 21 would be available. The level 2 resource block 21 could then be combined with the level 2 resource block 25 to make available the level 3 resource block 26. Accordingly, as a result of fragmented/inefficient resource allocation at lower levels in the hierarchy, it may be difficult to provide a higher level resource block to a resource request even though there are sufficient, available resources in the resource pool to accommodate the higher level resource request.

In a pooled resource system where resources are allocated according to a particular strategy, different types or groups of pooled resources will likely have different resource allocation structures or algorithms. If more than one type of resource is required to satisfy individual service requests, coordinating the allocation of both types of resources using two or more resource structures and/or algorithms becomes complicated and inefficient.

Consider the following example in a Code Division Multiple Access (CDMA) communications system. In order for a user to transmit information, the user must be allocated a spreading code (a software resource) corresponding to a particular channel capacity. Certain spreading codes have a smaller capacity. Other spreading codes in a spreading code resource hierarchy or tree may correspond to plural ones of smaller spreading code resources. As a result, a higher capacity, spreading code parent can only be allocated if its corresponding lower capacity, spreading code children are all available. If one of those spreading code children is already allocated, the higher capacity channel spreading code parent cannot be allocated.

In addition to a software spreading code resource, a user must be allocated the necessary hardware resource to physically perform the communication. An example of such hardware includes Digital Signal Processing (DSP) and/or radio transceiver circuitry. For example, a lowest capacity channel might use only one DSP and/or transceiver hardware unit. On the other hand, a higher capacity channel may require more than one DSP and/or transceiver hardware unit. Similarly, the higher capacity parent can only be allocated if all its supporting children are available. The fact that two different resource hierarchies, (i.e., software and hardware resources) in the above example, must be navigated makes the provision of an appropriate capacity spreading code with appropriate capacity hardware resources particularly cumbersome and inefficient. Not only are two resource allocation strategies required for each pool of resources, there is no guarantee that just because a suitable resource is available from one pool that a corresponding and necessary resource from the other pool is also available.

It is an object of the present invention to overcome inefficiency by providing a resource pool structure including a data structure reflecting the free resources in the pool and that permits organized and efficient but still flexible allocation and de-allocation of resources.

It is a further object of the present invention to ensure that resource units are evenly utilized in a resource pool.

It is another object of the present invention to selectively re-allocate resources among the resource users to free other resources that can be used to form higher level resource blocks in order to meet a particular resource demand or to simply make available higher level resource blocks.

It is another object of the present invention to determine and implement a resource pool structure data structure, mirroring the free resources in the resource pool, that best suits current resource demands.

It is yet another object of the present invention to ensure that different types of resource units, e.g., hardware resources and software resources, are cooperatively allocated in response to resource requests in an efficient and effective manner.

The present invention configures a pool of resource units using a logical structure that includes first level and second level resource blocks. The terms "configure resources" or "configuration of resources" refer to a data structure which is organized to reflect or represent actual or physical resources. However, the actual resources themselves are not necessarily configured in a resource hierarchy like that shown in FIG. 1. Each first level resource block corresponds to an individual resource unit, where an individual resource unit is the smallest resource that a resource handler allocates from the resource pool. The first level resource blocks are provided in groups that form a lowest level of the resource pool structure. Each second level resource block corresponds to one of the groups of the first level resource blocks. For example, two first level resource blocks form a first level resource block group logically linked to a second level resource block. The second level resource blocks are provided in groups and form a next higher level of the resource pool structure.

Resources are allocated from the resource unit pool in an efficient manner. For example, if a request is made for a first level resource block, an available first level resource block is allocated from a partially-allocated, first level resource group where one or more first level resource blocks are currently already allocated. If a first resource block is not available, then an available first level resource block is created. In this case, a second level resource block is converted into a corresponding group of first level resource blocks, and one of the converted, first level resource blocks is then allocated to the request. A similar procedure is used at a next higher level, i.e., at third level resource blocks and groupings. In other words, if a first resource block is not available at the first level and cannot be obtained by conversion of a resource block at the second level, a third level resource block is converted into a corresponding group of second level resource blocks; a converted second level resource block is converted into a corresponding group of first level resource blocks; and one of the converted first level resource blocks is allocated.

Resource blocks are also restored to the resource unit pool structure efficiently. For example, a returned first level resource block is restored to a partially-allocated, first level resource block grouping. If that returned block completes that grouping, a new, second level resource block is made available. In one preferred embodiment, when a resource block is restored, the physical resource is restored to the same position in the resource array as from where it was originally allocated. However, the corresponding resource block in the data structure is placed last in a list of free resource blocks. This ensures that each of the physical resources in the pool is used about the same amount over time.

The resource pool is managed by a resource handler which stores in memory a data structure that mirrors the current status (free or occupied) of the resources in the resource pool. The resource pool structure represents and maintains the logical relation between resource units/blocks. For example, the data structure may include multiple lists, each list corresponding to a resource block level and each record/entry in the list representing one free resource unit. The list does not include allocated resource units.

To properly manage the resource unit pool or to otherwise meet a particular a resource request/demand, a resource handler may re-allocate resource units by moving a resource user from one resource block to another at that same level in order to create additional resource blocks at the next higher level. The resource handler may also receive traffic statistics about the number of requests for different level resource blocks collected by a statistics analyzer and determine which level in the resource unit pool structure receives the greatest number of requests, i.e., the most popular level. In an example communication system, assume the system capacity is eight voice calls or two data calls. Most of the calls in the system during busy hours are voice calls. During busy hours, if the whole system capacity is allocated for data calls, no voice calls can be made resulting in an insufficient subscriber service level in the area. By restricting the use of the transmission capacity, at least a minimum level of service for data calls and voice calls can be assured. The resource handler then re-allocates resource units in the current resource pool configuration to create additional resource blocks at the most popular level.

The present invention also cooperatively allocates different types of resource units in response to a resource request in an efficient and effective manner. An example of different types of resource units that may be cooperatively allocated include software resources and hardware resource units. A first data structure may be configured to correspond to a first pool of a first type of resource unit, e.g., software resource units. A second data structure may be configured to correspond to a second pool of a second type of resource unit, e.g., hardware resource units. A relationship is established between resource units in the first and second resource unit pools so that if one of the first resource units is available for allocation, a corresponding second resource unit is also assured available. Then when a request is received for a resource, one or more available resource units from both the first and second resource pools may be allocated using the established relationship.

The established relationship between two resource pools may be implemented, for example, using a mapping mechanism such as a matrix, where each row in the matrix represents different resource units of the first type and each column represents different resource units of the second type. Selection of a row corresponding to a resource unit of a first type automatically selects a corresponding resource unit of the second type associated with an activated column in the matrix. For a one-to-one type example relationship, the matrix is configured so that each row actively intersects with only one of the columns. The mapping relationship can be reconfigured by changing which row-column intersections are active.

Using the established relationship, only one resource selection algorithm is employed which simplifies resource allocation procedures involving more than one pool of resource units. Thus, the use of two or more separate resource selection algorithms is avoided. The need for "synchronizing" separate resource algorithms is also avoided. In other words, without the present invention, failure to synchronize plural resource selection algorithms leads to situations (not encountered in the present invention) where an available resource unit in one pool is allocated without a corresponding and necessary resource unit from another pool being available, e.g., as a result of different fragmentations resulting from previously allocated resources.

The present invention has particularly advantageous application to communications systems, and in particular, to radio communications systems. A preferred example embodiment of the present invention is disclosed in the context of a wide band, code division multiple access (WCDMA), spread spectrum, radio communications system. In the context of a W-CDMA radio communications system, the first pool of resource units may correspond to W-CDMA spreading codes (software type resource units), and a second pool of resource units may correspond to data processing and transceiver units (hardware resource units). Of course, as evident from the above description, the present invention has general applicability and is not limited to communications environments. Various features and advantages of the present invention, some of which have been described above, will be disclosed in further detail in conjunction with the drawings and detailed description.

BRIEF DESCRIPTION OF THE DRAWINGS

These and other objects, features, and advantages of the present invention will now be described in conjunction with the drawings in which:

FIG. 1 is a diagram showing a resource unit hierarchy which is one example structure that may be imposed upon a resource pool;

FIG. 2 is a diagram showing a fragmented resource allocation using the resource unit hierarchy from FIG. 1;

DETAILED DESCRIPTION OF THE DRAWINGS

In the following description, for purposes of explanation and not limitation, specific details are set forth, such as particular embodiments, data flows, techniques, etc. in order to provide a thorough understanding of the present invention. However, it will be apparent to one skilled in the art that the present invention may be practiced in other embodiments that depart from these specific details. For example, while a preferred example embodiment of the present invention is described in the context of an example of a WCDMA radio network, those skilled in the art will appreciate that the present invention has wide application to communications and data processing systems. In other instances, detailed descriptions of well-known methods, interfaces, devices, and signaling techniques are omitted so as not to obscure the description of the present invention with unnecessary detail.

Figure 3:
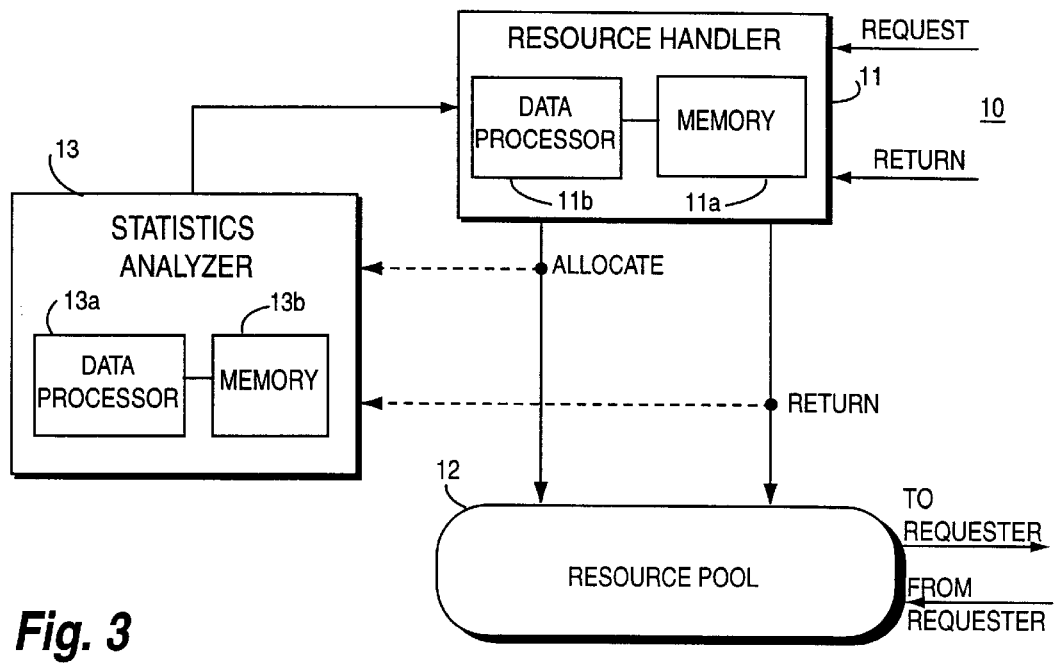
FIG. 3 is a resource management system in accordance with a general embodiment of the present invention.

Referring to FIG. 3, a general embodiment of the present invention as a resource management system 10 configures a data structure mirroring the free resources in a pool of resources 12 using a hierarchical or other layered structure. One example hierarchical structure is shown in FIG. 1 including resource blocks at various levels one, two, three, . . . N. Resource blocks at each level are configured into groups, each group linked to one resource block at the next higher level. Thus, in the example in FIG. 1, two level 1 resource blocks form a level 1 resource block group. A single level 2 resource block is linked to one of the level 1 resource block groupings. A single level 3 resource block is linked to a level 2 resource block grouping corresponding in the example shown in FIG. 1 to two consecutive level 2 resource blocks. Of course, groupings and/or structures other than that shown in FIG. 1 may be employed.

The resource management system 10 shown in FIG. 3 also includes a resource handler 11 and a statistics analyzer 13 in order to efficiently and otherwise optimally manage the allocation and return of resources from resource pool 12. The resource handler 11 includes a memory 11a and a data processor 11b. The statistics analyzer 13 also includes a data processor 13a and suitable memory 13b. As explained above, the statistics analyzer 13 monitors one or both of the allocations and returns of resources from/to resource pool 12. The statistics analyzer provides this information in an appropriate format to resource handler 11 which may, depending upon an analysis of the statistics, reorganize or otherwise reconfigure the resource pool hierarchy. Although the resource handler 11 and statistics analyzer 13 are shown as separate elements, each having its own data processor and memory, those skilled in the art will appreciate that they may be implemented using common data processing circuitry and memory.

In general, (though not always), the resource handler 11 attempts to allocate resource blocks to the extent possible so that higher level resource blocks are preserved for allocation. Consequently, the resource handler 11 first tries to allocate resource blocks from a grouping in which another resource block has already been allocated. Only when all of the resource blocks in a partially-allocated grouping are all currently allocated does the resource handler 11 draw upon another resource block group at that same level. When there are no available groups at the requested resource level, the resource handler 11 converts an available resource block from a next higher level (again from a group that is currently partially-allocated if possible) into a group at the requested resource block level. Then one of the converted resource blocks is allocated to the resource request. If there are no available resource blocks for conversion at that higher level, then the resource handler moves to the yet next, higher level and makes the necessary conversions through two levels to provide the requested resource block.

Similarly, if a resource block is returned to the resource pool 12, the resource handler 11 returns the resource block, with its status changed from occupied to free, to the same position in the resource array as from where it was allocated. Moreover, the resource handler 11 also endeavors, in a preferred example embodiment, to return resources in a manner such that the same resources are not always allocated, e.g., a round robin selection and return. Instead, utilization of resource blocks at each level is substantially equally distributed over time amongst all of the resource blocks at that level.

Because the allocation and restoration of resource blocks to the resource pool hierarchy typically depends on external factors, the resource handler 11 preferably periodically, or when needed, reconfigures the resource pool 12 to attain a more efficient configuration. For example, a resource block currently allocated may be de-allocated and another resource block at that same level in a more efficient position in the hierarchy may be reallocated to that request thereby making available higher level resource blocks for future allocation.

Figure 4:
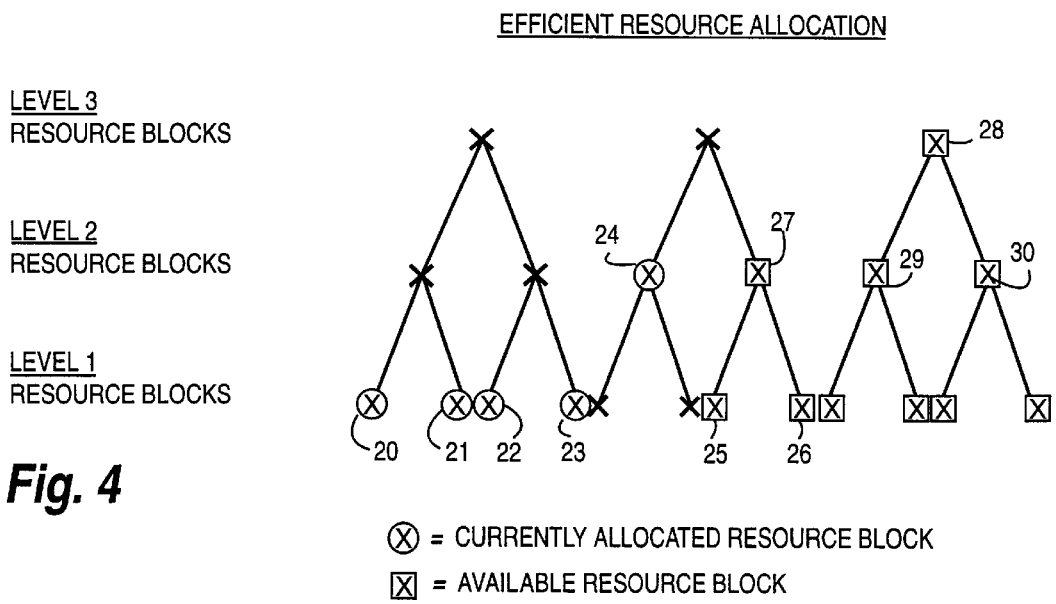
FIG. 4 is an example of an efficient resource allocation for the resource unit hierarchy of FIG. 1 in accordance with one example application of the present invention.

FIG. 4 shows a resource hierarchy configuration example in which resources are efficiently allocated using the present invention in contrast to the inefficient, fragmented resource block allocation shown in FIG. 2. Level 1 resource blocks are allocated in sequential fashion from left to right across each hierarchical level. In this example, level 1 resource blocks 20–23 are currently allocated. The next two level 1 resource blocks are allocated to a level 2 resource block 24. In response to a resource request for a level 1 or a level 2 resource block, the resource handler 11 would draw upon level 1 and level 2 resource blocks 25–27, respectively. As a result of this efficient resource allocation, a level 3 resource block 28, or alternatively, two additional level 2 resource blocks 29 and 30, is (are) available for higher level request allocations.

Figure 5:
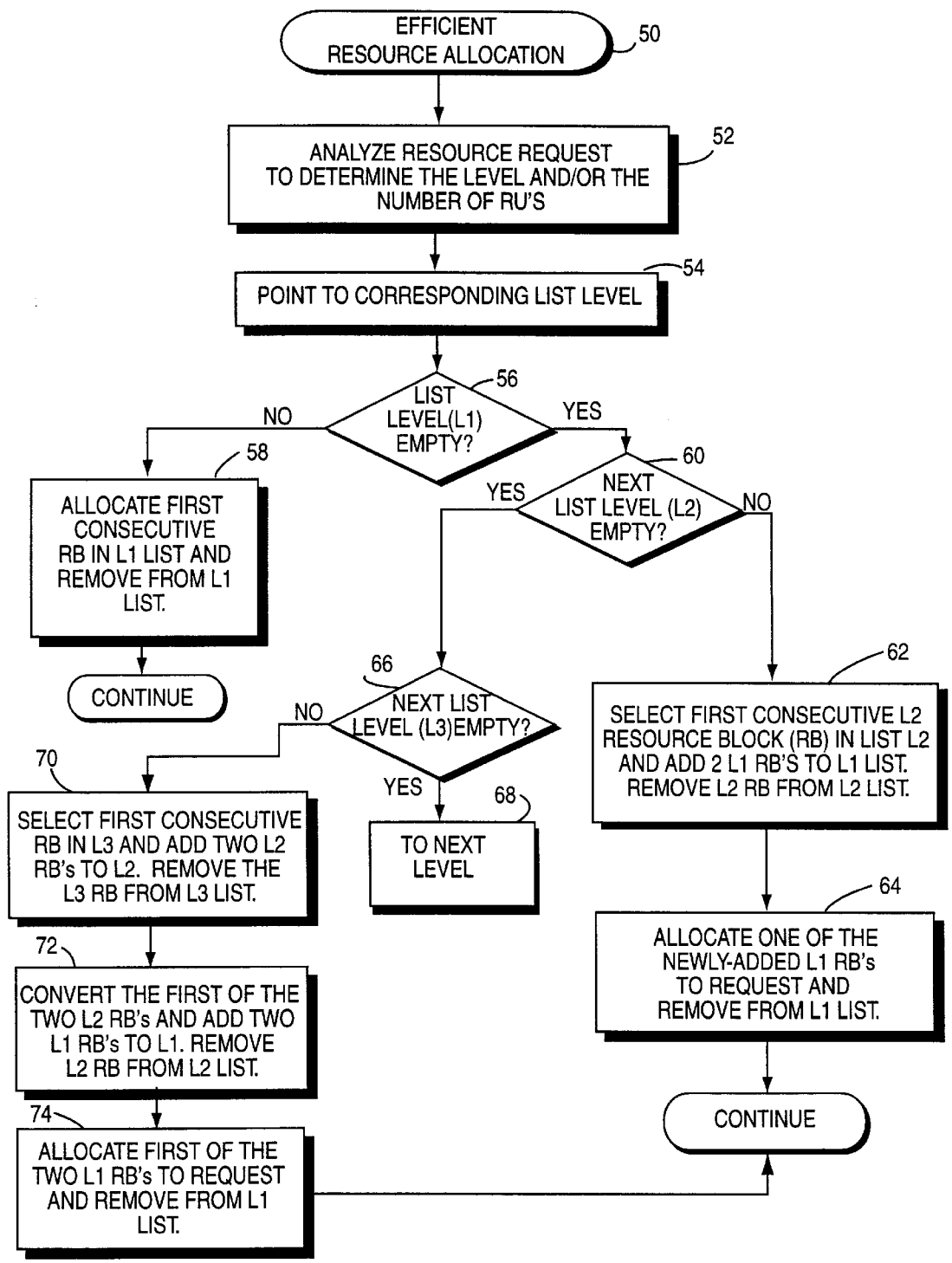
FIG. 5 is a flowchart diagram illustrating one set of example procedures for efficiently allocating resources in accordance with one aspect of the present invention.

FIG. 5 shows a flowchart diagram illustrating example procedures (entitled Efficient Resource Allocation, at block 50) that may be followed by the resource handler 11 for efficiently allocating resources from resource pool 12 in accordance with one preferred, but nevertheless example, embodiment of the present invention. The resource handler 11 analyzes an incoming resource request to determine the level of the request in the resource pool hierarchy or other structure (Block 52). For example, the resource request may require a certain number of resource units. Using the example hierarchical configuration shown in FIG. 1, if the request is for one resource unit, a level 1 resource block must be allocated; if the request is for two resource units, a level 2 resource block must be allocated; and if the request is for four resource units, then a level 3 resource block must be allocated, and so forth.

The resource pool configuration is mirrored in a list-based data structure stored in memory 11a accessed by resource handler 11. A corresponding list is maintained for each level in the resource pool configuration structure. A detailed example of such a list-based data structure will be described below in conjunction with the example embodiment of FIGS. 8 and 9.

Based on that analysis, the resource handler 11 points to the corresponding level list (block 54) and decides if the corresponding list is empty (block 56). The list from level 1 (L1) is used as an example. In other words, the L1 list of resources in the resource pool 12 stored in the resource handler memory 11a is checked to detect any L1 resource blocks, i.e., from an L1 grouping with one or more resource blocks currently allocated.

If the L1 list is not empty, the resource handler 11 allocates the first available L1 resource block in the L1 list and removes it from the L1 list in memory 11a (block 58). On the other hand, if the L1 list is empty, the resource handler 11 determines whether the next level list, level 2 (L2) in this example, is empty (block 60). If there are entries detected in the L2 list, the resource handler 11 removes the first (if any) level 2 resource block from list L2 and adds a group of two (in this example) level 1 resource blocks to the L1 list (block 62). More generally, the resource handler 11 creates a group of level 1 resource blocks from a single level 2 resource block. One of the newly-added level 1 resource blocks is allocated by the resource handler 11 to the request and removed from the L1 list in resource handler memory 11a (block 64).

Alternatively, if there are no entries currently shown at list level L2 in memory 11a (block 60), the resource handler 11 determines whether the next list level, in this example the list for level 3 (L3) in the hierarchy, is empty (block 66). If not, the resource handler 11 selects the first available resource block from list L3 and converts that L3 resource block into a group of level 2 resource blocks (in this example two). This conversion effectively adds two L2 resource blocks to the L2 list and removes the L3 resource block from the L3 list (block 70). The resource handler 11 converts the first of the two, newly-created L2 resource blocks into a group of L1 resource blocks thereby adding two resource block entries to the L1 list (block 72). The converted L2 resource blocks accordingly removed from the L2 list in resource handler memory 11*a*. The resource handler 11 then allocates the first of the two newly-created L1 resource blocks to the resource request, and removes that L1 resource block from the L1 list in memory 11*a*. If the L3 list is empty, control proceeds to the next level (block 68), and similar procedures are performed.

Figure 6:
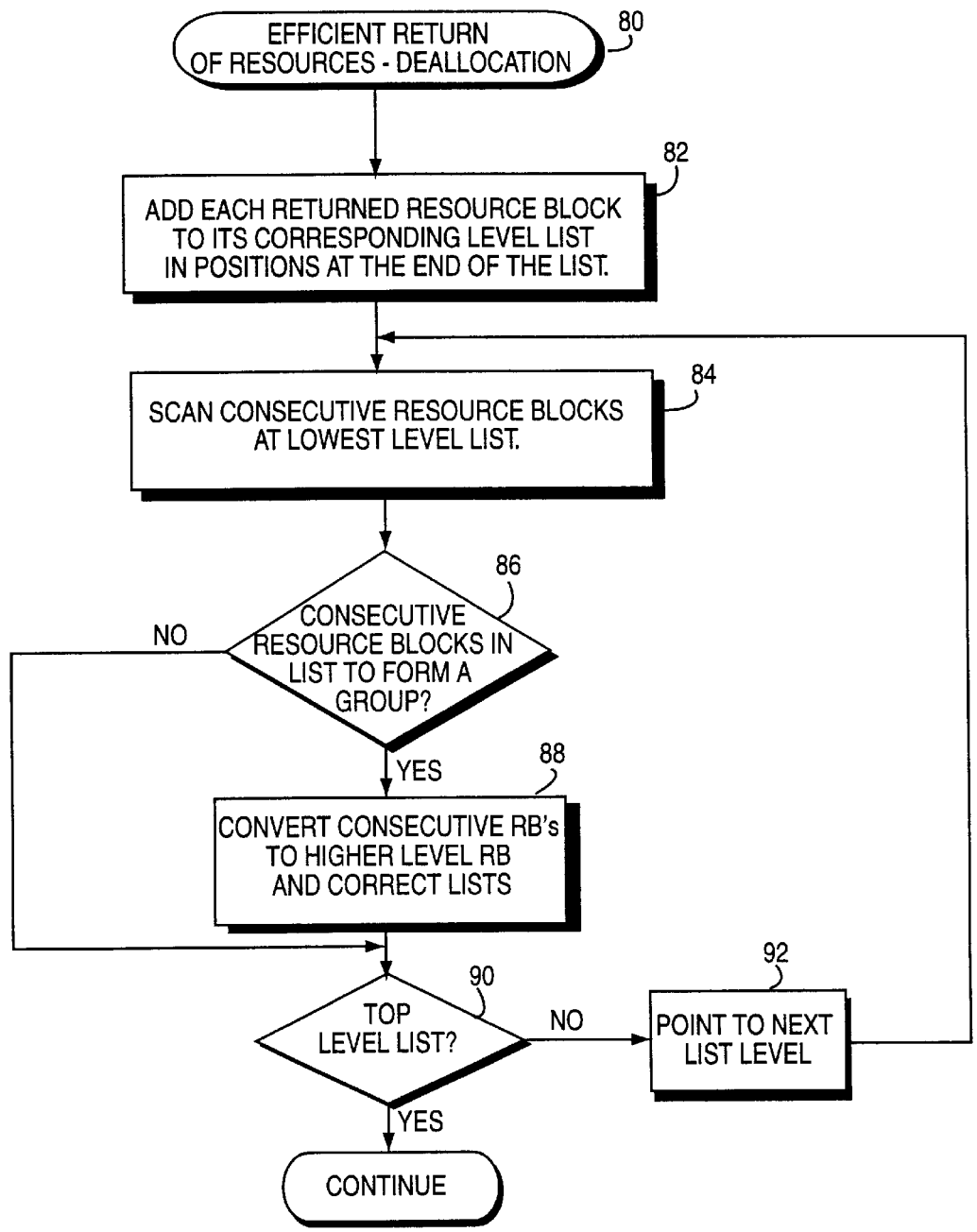
FIG. 6 is a flowchart diagram illustrating one set of example procedures for efficiently returning resources in accordance with one aspect of the present invention.

FIG. 6 illustrates an Efficient Return of Resources routine (block 80) implemented by the resource handler 11. Each returned resource block (RB) is added to its corresponding level list (block 82). If resource blocks are allocated at one end of a particular list in the hierarchy or other structure, then it is preferable to evenly distribute utilization of resource blocks by returning resource blocks to the opposite end of that list so that all of the other resources at that level will be used before the just-returned resource is used again. This technique for allocating and de-allocating resources circulates the resource blocks so that they are all used substantially uniformly.

Returning a resource block to the resource pool 12, the resource handler 11 scans consecutive resource blocks at the lowest level list (block 84). A decision is made (block 86) if the consecutive number of resource blocks in this list form a resource block group (block 86). If so, the resource handler 11 converts them into a higher level resource block and corrects the lists corresponding to both levels (block 88). A decision is made (block 90) if the top list level is reached. If not, the resource handler 11 points to the next list level in memory 11*a* (block 92) and control returns to block 84 to repeat the operations indicated in blocks 84–90. Thus, resource blocks are returned to the list and are grouped in such a fashion so that the highest level resource blocks can be made available.

Consider the following illustrative example. If the resources to be allocated represent hardware equipment, for example, it is advantageous to spread the resource allocations over all the resources. In that way, all the hardware is periodically checked for functionality rather than only when there is a heavy load requiring allocation of most or all resource units. This may be accomplished using the method outlined above with respect to FIG. 6 above, by always allocating free resources at a front end of the list, and returning the resources to the back end. The following illustrates this:

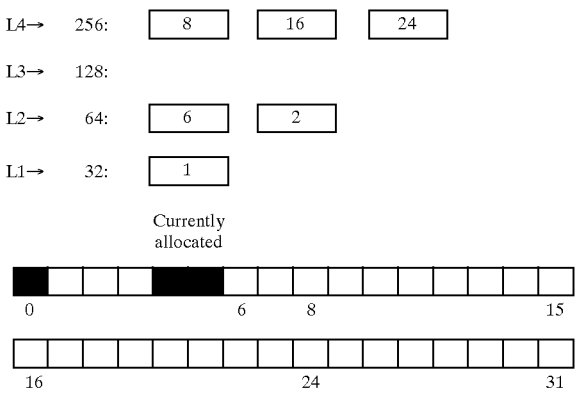

The resource at position 5 (one resource unit corresponding to capacity 32) is then returned to the last position in list L1. This leaves the following free resources:

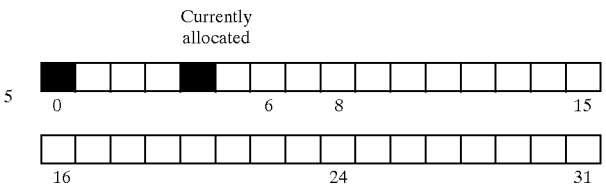

Figure 7:
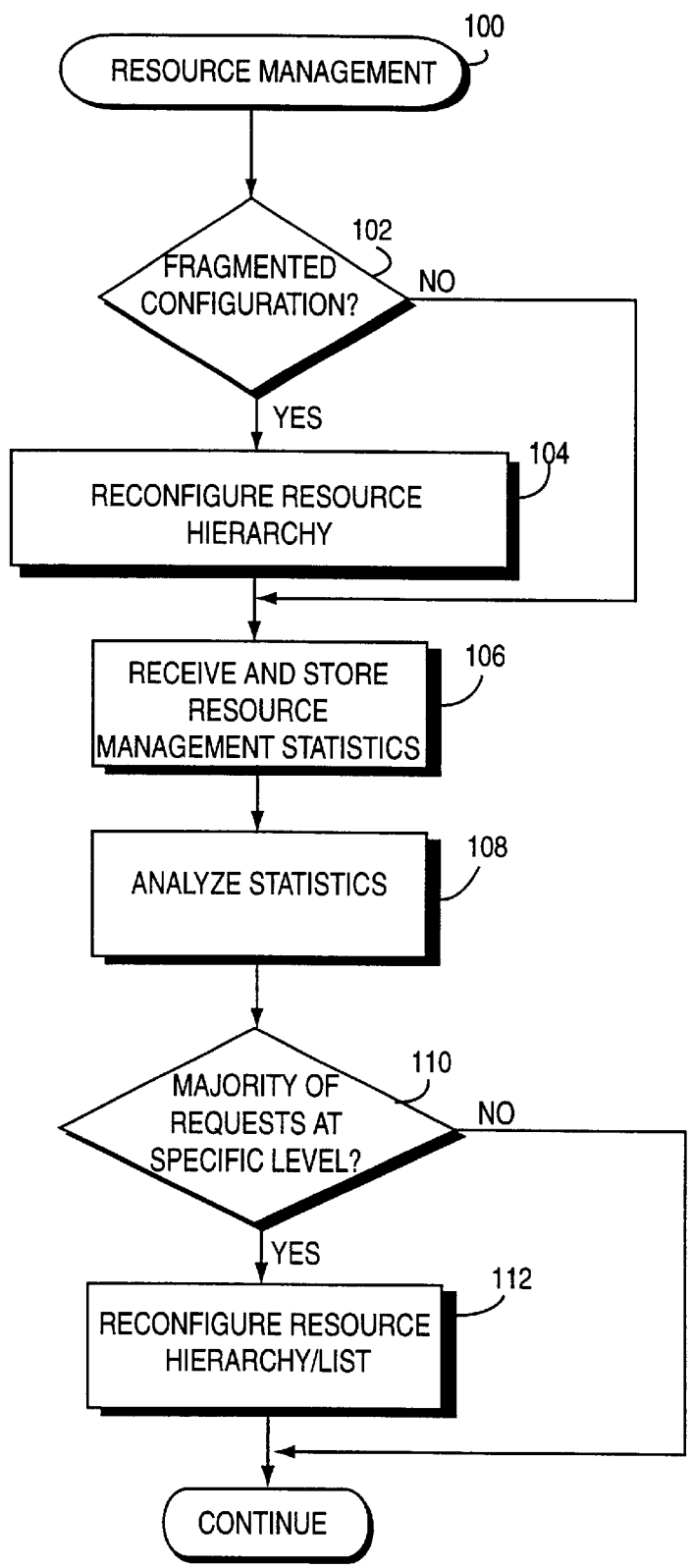
FIG. 7 is a flowchart diagram illustrating one set of example procedures for reconfiguring a resource structure in accordance with one aspect of the present invention.

The resource handler 11 also performs periodic resource management functions as will be explained in the example Resource Management routine (block 100) shown in FIG. 7. The resource handler 11 determines whether the resource pool configuration is currently fragmented (block 102). If so, the resource handler 11 reconfigures the resource hierarchy or other structure (block 104) to de-fragment the current configuration. Certain resource requests may be reallocated to different resource blocks in order to group resource blocks so that the greatest number of highest level resource blocks are made available as described above.

The resource handler 11 also periodically receives statistics from statistics analyzer 13 continually gathered by statistics analyzer data processor 13*a* and stored in corresponding memory 13*b* before being transferred to the resource handler memory 11*a* (block 106). The resource handler 11 periodically analyzes the accumulated statistics (block 108) and decides, based on that analysis, whether a majority of the resource requests are occurring at a specific resource block level. For example, while the resource hierarchy is generally reconfigured in order to make available the resource blocks of the highest possible level, it may be that most of the resource requests occur at a level below the highest resource block level. Thus, in a simple example where there are three levels of resource blocks, it may be that only a small number of level 3 resource blocks are requested and that level 2 resource blocks are the most popular. Accordingly, rather than reconfiguring the resource pool which causes some disruption (albeit likely minimal disruption) in service for those allocated resource blocks that are reallocated, the resource handler 11 reconfigures the resource hierarchy to create as many level 2 resource blocks as possible (block 112). If a request is later made for a higher level 3 resource block, the resource handler 11 will generate (if possible) a level 3 resource block at the time of that request by combining (again, if available) a complete level 2 resource block grouping to create a single level 3 resource block. This type of statistical analysis and reconfiguration minimizes disruptions to service and also reduces data processing overhead required in combining and dividing various resource block groupings to make available a higher level resource block.

Figure 8:
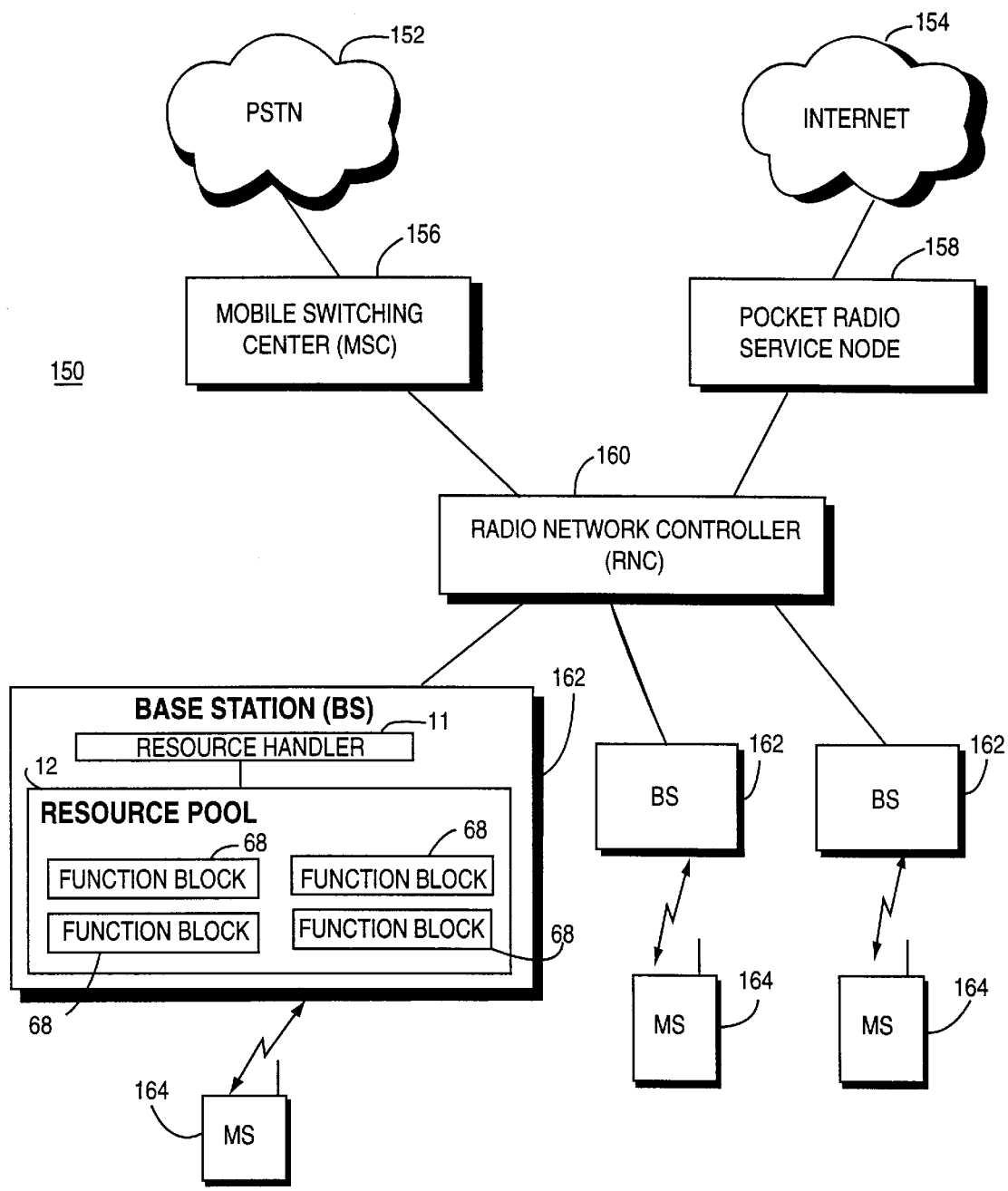
FIG. 8 is a function block diagram illustrating a radio communications system in which the present invention may be advantageously applied is a function block diagram illustrating a set of procedures for efficiently returning resources to the resource pool in accordance with one preferred but nevertheless example embodiment of the present invention.
Figure 9:
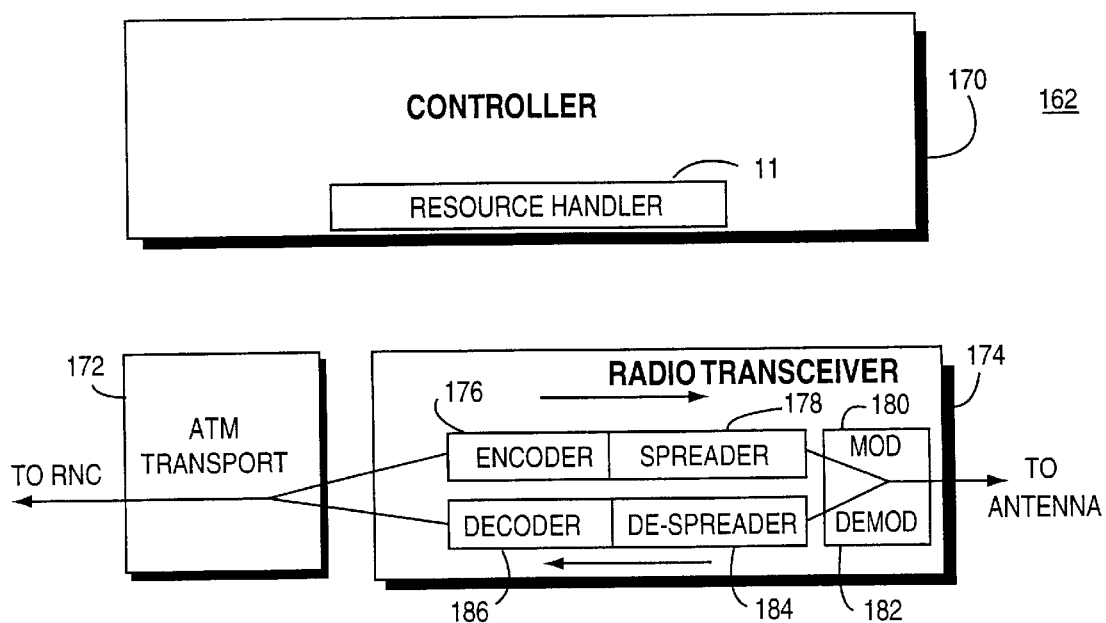
FIG. 9 is a function block diagram illustrating in further detail an implementation of the present invention in a base station in a wideband code division multiple access radio communications system in accordance with one preferred but example embodiment of the present invention.

While the present invention may be advantageously applied to many environments, one example environment is portable radio communications. FIG. 8 illustrates in function block diagram format a portable radio communications system 150. Mobile switching center (MSC) 156 interfaces a public switched telephone network (PSTN) 152 to the mobile communications network 150. A packet radio service node 158 interfaces data communications from the Internet 154 with the mobile radio communications system. Both the MSC 156 and packet radio service node 158 are coupled to a radio network controller (RNC) 160. Although only one RNC is shown for purposes of simplified illustration, those skilled in the art will appreciate that more than one RNC may be employed. The radio network controller 160 is coupled to a plurality of base stations (BS) 162. Portable radios illustrated as mobile stations (MS) 164 communicate over an air interface with one or more base stations 162 using a variety of protocols and procedures known to those skilled in the radio communications art.

Each base station includes (among other things) a resource handler 11 and resource pool 12 such as those shown in FIG. 3. Resource pool 12 is comprised of function blocks 68 where each function block is divided into various resource units that can be uniquely addressed and allocated to support various services provided by the portable radio communications system 150. The function blocks 68 in resource pool 12 can correspond to hardware and/or software resources required, for example, to assign radio channels to provide radio communications with the mobile stations 164.

Depending upon parameters of a particular call setup, more or less resources are required for the call. For instance, if the call is a basic voice communication, a smaller number of resource units is required than for a more complicated call, e.g., a multimedia call including voice, data, video, etc. Even among data calls there are different bandwidth requirements for high speed and low speed data calls with higher bandwidth data calls requiring more resource units than lower bandwidth data calls.

To accommodate wireless, multimedia communications, efficient resource unit allocation and return must be achieved so that multimedia and other high bandwidth calls requiring higher level resource blocks can be handled as well as lower level resource blocks associated with less demanding calls. A preferred access methodology that accommodates multimedia and other high demand communications services is wide-band code division multiple access (WCDMA). Calls are allocated across a very wide frequency bandwidth, e.g., 5, 10, 15, etc. MHz, using orthogonal spreading codes, where one or more codes are assigned to each call. Each orthogonal spreading code is an example of a software-type resource block. Each base station is assigned a limited number of spreading codes.

Assuming that the mobile communications system 150 is a WCDMA system, the base station 162 may include a controller 170, an asynchronous transfer mode (ATM) transport 172, and a radio transceiver 174. An ATM transport interface to the radio network controller 160 is preferred because of its high efficiency and throughput. Controller 170 includes among other things a resource handler 11 and statistics analyzer 13 such as those shown in FIG. 3. The radio transceiver 174 includes a number of function resource blocks such as an encoder 176, a CDMA spreader 178, a modulator 180 for radio transmissions to the mobile stations 164. Additional function resource blocks are employed in the form of a demodulator 182, a CDMA de-spreader 184, and a decoder 186 for demodulating, de-spreading, and decoding radio transmissions from mobile stations 164.

Each function resource block corresponds to one or more hardware and/or software resource units, where a resource unit is an integral functional unit having a unique address that can be individually addressed and operated. For example, an encoder employs both hardware and software resource units. When a resource unit is allocated to a resource request, it is enabled and can then process data input provided by the requester.

The resource handler 11 maintains a "picture" of the resource units in a list data structure having a corresponding list for each free resource block level in its memory 11a. Each record/entry in a list represents one free resource block and may include information such as the type of resource unit (e.g., spreading code, encoder, modulator, etc.), resource unit address, current configuration, current state (enabled/disabled), etc.

When setting up a path for a call through the base station 162, one or more resource units from the various different function blocks 176–186 must be allocated. For a relatively simple voice call/path through the base station, an 8 kbps corresponding to a 32 kilosymbol per second (ksps) might use one encoder resource unit. The relationship between bit rate and symbol rate depends upon the particular coding employed in the encoder. On the other hand, a 64 ksps path might require two encoder resource units.

Consider an example where there are four resource block levels with level 1 corresponding to 32 ksps resource blocks, level 2. corresponding to 64 ksps resource blocks, level 3 corresponding to 128 ksps resource blocks, and level 4 corresponding to 256 ksps resource blocks. A list is maintained for each level L1–L4. As described above, if a list at a particular level is empty, the resource handler moves to the next level and converts an available resource block into plural resource blocks at the next lower level. In this example, the base station 162 includes 32 resource units. A map of the free resource units at a particular time is shown below with shaded blocks corresponding to currently allocated resource units, each block is identified by an index with indices 0, 4, 8, 15, 16, 24, and 31 being shown.

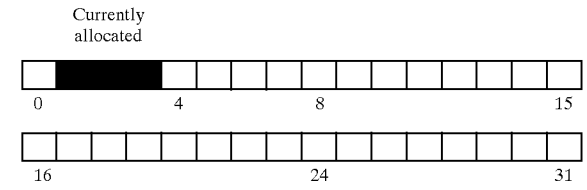

Note that resource blocks 1, 2, and 3 are currently allocated. As mentioned above, one 32 ksps channel requires allocation of one resource unit or one of the 32 blocks. A 64 ksps channel requires two resource units and therefore must be assigned starting with index/address 0, 2, 4, . . . 28 or 30. A 128 ksps channel requires four consecutive resource units starting with index positions 0, 4, 8, . . . 24, or 28. A 256 ksps channel requires eight consecutive resource units starting with index positions 0, 8, 16, or 24. Assuming that resource units are configured to provide the largest number of highest level groups as possible produces the resource structure shown below:

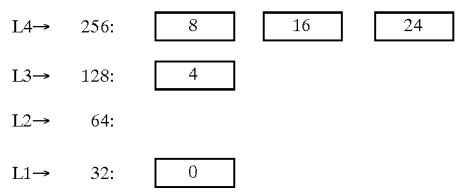

Following the above example, a request for a 64 ksps channel means that the resource handler 11 scans the level 2 (L2) list. Since the L2 list is empty, the resource handler 11 converts a 128 ksps resource block into two 64 ksps resource blocks starting at index 4 which results in the following:

L4→ 256: | 8 | 16 | 24 |

L3→ 128:

L2→ 64: | 4 | 6 |

L1→ 32: | 0 |

The conversion provides two 64 ksps blocks at indexes 4 and 6. The 64 ksps block at index 4 is allocated (i.e., because it is first in the L2 list) and removed from the L2 list resulting in the following:

L4→ 256: | 8 | 16 | 24 |

L3→ 128:

L2→ 64: | 6 |

L1→ 32: | 0 |

The current resource map is then as follows:

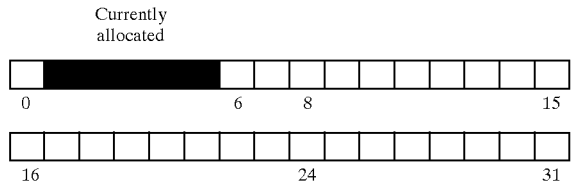

When resource units are returned (de-allocated), the resource units are placed last in the appropriate level list, i.e., the list having resource blocks of the same size. The resource manager 11 scans the list for consecutive resource blocks, and when the requisite number of consecutive resource blocks is detected, a next level resource block is created.

Consider for example the return of a 32 ksps resource block to the list of free 32 ksps resource blocks. Also assuming that the groupings include two resource blocks, if two consecutive 32 ksps resource blocks are in the list, the resource handler 11 creates a single 64 ksps resource block and deletes the two 32 ksps resource blocks from their respective lists. Consider the following example map of free resource blocks at the base station 162 having as mentioned above a total number of 32 resources.

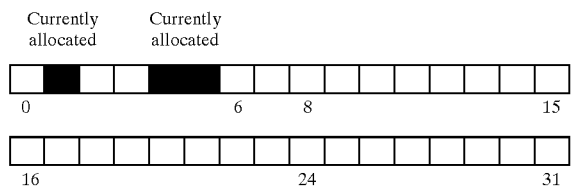

Assume that the 32 ksps resource block at index position 1 is returned to the resource pool. The resource handler 11 enters that resource block last into the list of free 32 ksps resource blocks resulting in:

L4→ 256: | 8 | 16 | 24 |

L3→ 128:

L2→ 64: | 6 | 2 |

L1→ 32: | 0 | 1 |

The resource handler 11 then scans this list for two consecutive resource blocks that can be grouped together to form a 64 ksps resource block as follows:

L4→ 256: | 8 | 16 | 24 |

L3→ 128:

L2→ 64: | 6 | 2 | 0 |

L1→ 32:

The resource handler 11 also scans for consecutive resource blocks in the 64 ksps resource block list. Since the two resource blocks start at zero and are consecutive, they are grouped together to form a 128 ksps resource block as follows:

L4→ 256: | 8 | 16 | 24 |

L3→ 128: | 0 |

L2→ 64: | 6 |

L1→ 32:

The resource handler 11 scans for consecutive resource blocks in the 128 ksps resource block list. Since there is only one resource block in this particular list, a 256 ksps resource block cannot be formed. The resource map after that allocation is as follows:

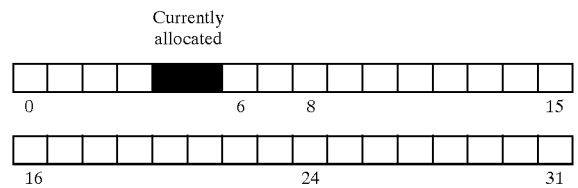

Such a list structure is also particularly advantageous in de-fragmenting the resource structure. The resource blocks to be moved are usually the resource blocks at lower level lists. Starting with the lowest level 32 ksps resource blocks, allocated resource blocks are moved to create as few larger level resource blocks as possible using the smallest number of de-allocations. Consider the following example of fragmented resources

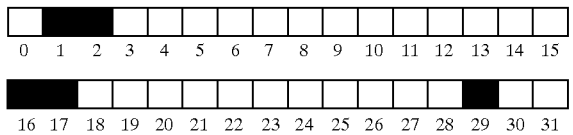

This configuration of fragmented resources is perhaps easier seen in the following resource structure map.

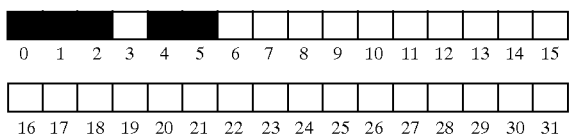

The resource structure may be more efficiently configured if the currently allocated 32 ksps resource blocks at index positions 1, 2, and 29 are allocated adjacent one another to make available larger resource blocks at their current respective positions. The first resource element at index position zero could be used to create a 64 ksps resource block if the 32 ksps allocation at index position 1 is moved to another index position. Accordingly, that 32 ksps allocation is moved logically to a buffer of allocated resources to be relocated. The lists for each level are processed in the same fashion except the highest level at 256 ksps.

The resource units are reassembled minimizing the number of resource blocks that have to be moved. Each 256 ksps resource block is examined to determine how many resource blocks need to be moved to complete that 256 ksps resource block. In this example, only two blocks from positions 16 and 29 need to be moved to the first position (starting at index position 0) of the first 256 ksps blocks. After de-fragmentation, the 32 ksps resource blocks have been re-located to adjacent index positions 0, 1, and 2. The 64 ksps resource block now occupies index positions 4 and 5. The resource structure map appears as follows:

Another aspect of the present invention relates to efficient allocation of resources from different pools of resource units. A request for resources very often involves allocation of different types of resource units. For example, a resource request may require both software and hardware resources. In the context of a wideband CDMA radio communications system, a request for a resource corresponding to a communications channel requires allocation of a user-specific spreading code (a software resource unit) a signal processing and transceiver unit (a hardware resource unit). Each of the resource pools may be configured in a hierarchical tree, such as already described above, and each resource pool may have its own resource allocation strategy. Coordinating two or more resource allocation strategies for two pools of different types of resource units can be quite complicated and inefficient. Using different allocation strategies, the respective hierarchies fragment differently. As described above, a higher capacity parent resource unit can only be allocated if all of its lower capacity children are available. All of these factors may well produce situations where a resource unit of one type, e.g., a spreading code, is allocated to a resource request but a corresponding and necessary resource unit of the other type, e.g., a transceiver unit, is not available (and vice versa).

Figure 10:
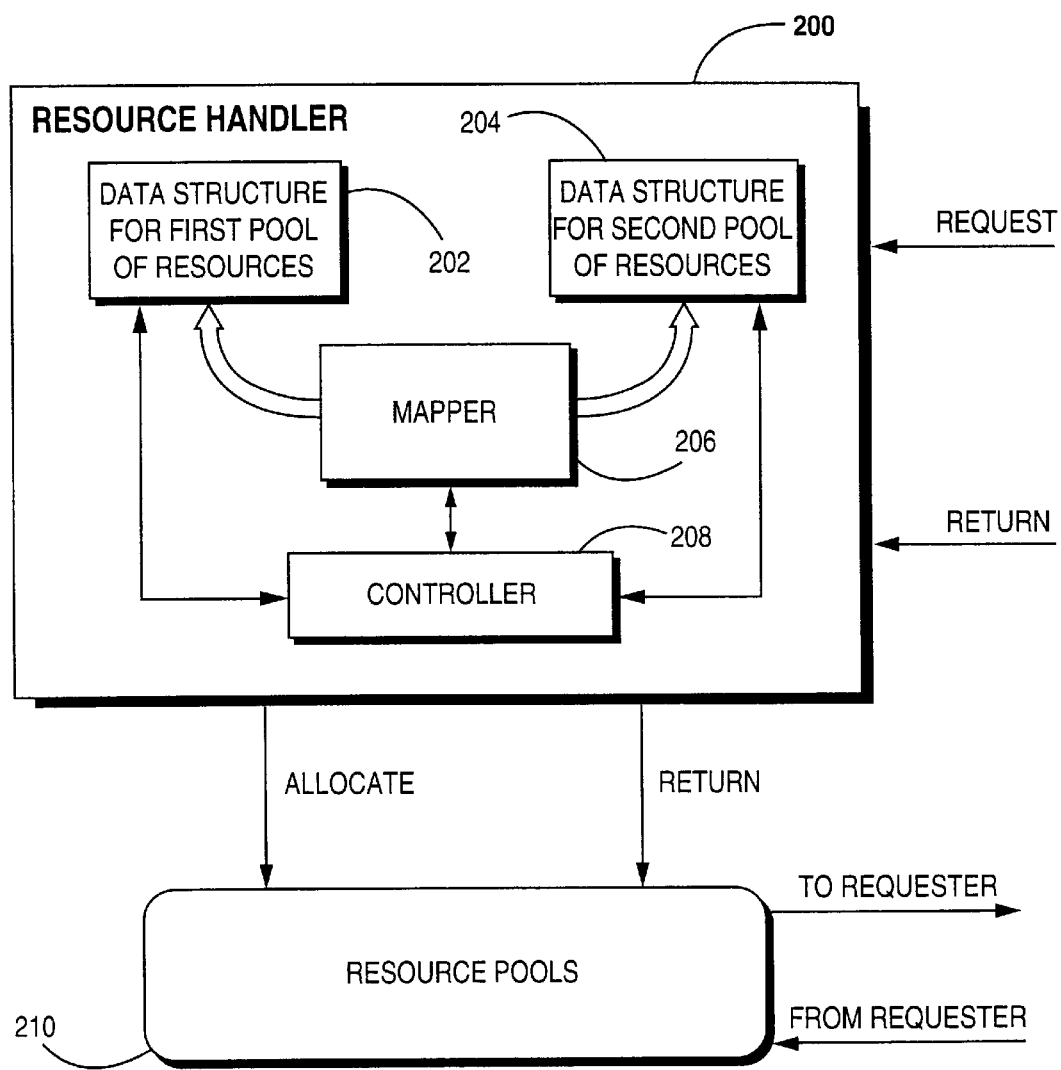
FIG. 10 is a resource management system in accordance with another embodiment of the present invention that draws upon resource units from different resource pools.

The present invention solves these problems by establishing a relationship between resource units in the first and second resource pools. Although the example embodiment employs two pools of different type resource units for description purposes, the invention applies to more than two resource pools. Referring now to the resource management system shown in FIG. 10, a resource handler 200 configures a first data structure 202 that mirrors the free resource units of a first type in a first resource pool included in the resource pools 210 using for example a hierarchical or other layered structure. However, any structure could be used to organize the resources. A second data structure 204 is configured to mirror the free resource units of a second type found in a second pool of resources contained in resource pools 210 again preferably using a hierarchical or other layered structure. One example hierarchical structure is shown in FIG. 1 above including resource units at various levels 1, 2, 3, . . . N. Resource units at each level are configured into groups, each group linked to one resource unit at the next higher level. Thus, in the example in FIG. 1, two level 1 resource blocks form a level 1 resource unit group. A single level 2 resource unit is linked to one of the level 1 resource unit groupings. A single level 3 resource block is linked to a level 2 resource unit grouping corresponding in the example shown in FIG. 1 to two consecutive level 2 resource units. An example of the first pool of resource units may be software resource units like CDMA spreading codes. The second pool of resource units may be hardware resource units such as signal processing and transceiving units.

The resource handler 200 includes a mapper 206 which establishes a relationship between ones of the resource units in the first pool mirrored by data structure 202 and resource units in the second pool mirrored by data structure 204. Mapper 206 may establish various types of suitable relationships. For example, the relationship might include a one-to-one correspondence between individual resource units in the first and second resource pools. In a hierarchical or layered configuration, the one-to-one correspondence could exist per unit per level.

A controller 208 controls allocation of resources in accordance with the relationship established by mapper 206 and also attempts to allocate lower level resource units so that higher level resource units are preserved for allocation. In other words, controller 208 first tries to allocate resource units from a grouping in which another resource unit has already been allocated. Only when all of the resource units in a partially-allocated grouping are currently allocated does the controller draw upon another resource group at that same level. When there are no available resource units at the requested resource level, the controller 208 converts an available resource unit from a next higher level (again from a group that is currently partially-allocated if possible) into a group at the requested resource unit level. The controller 208 also returns resource units to its resource pool and keeps track of which resource units are currently allocated and which are currently available. If possible, the controller 208 returns resource units in a manner so that the same resources are not always allocated so that utilization of resource units at each level is substantially equally distributed over time amongst all of the resource units at each level.

Figure 11:
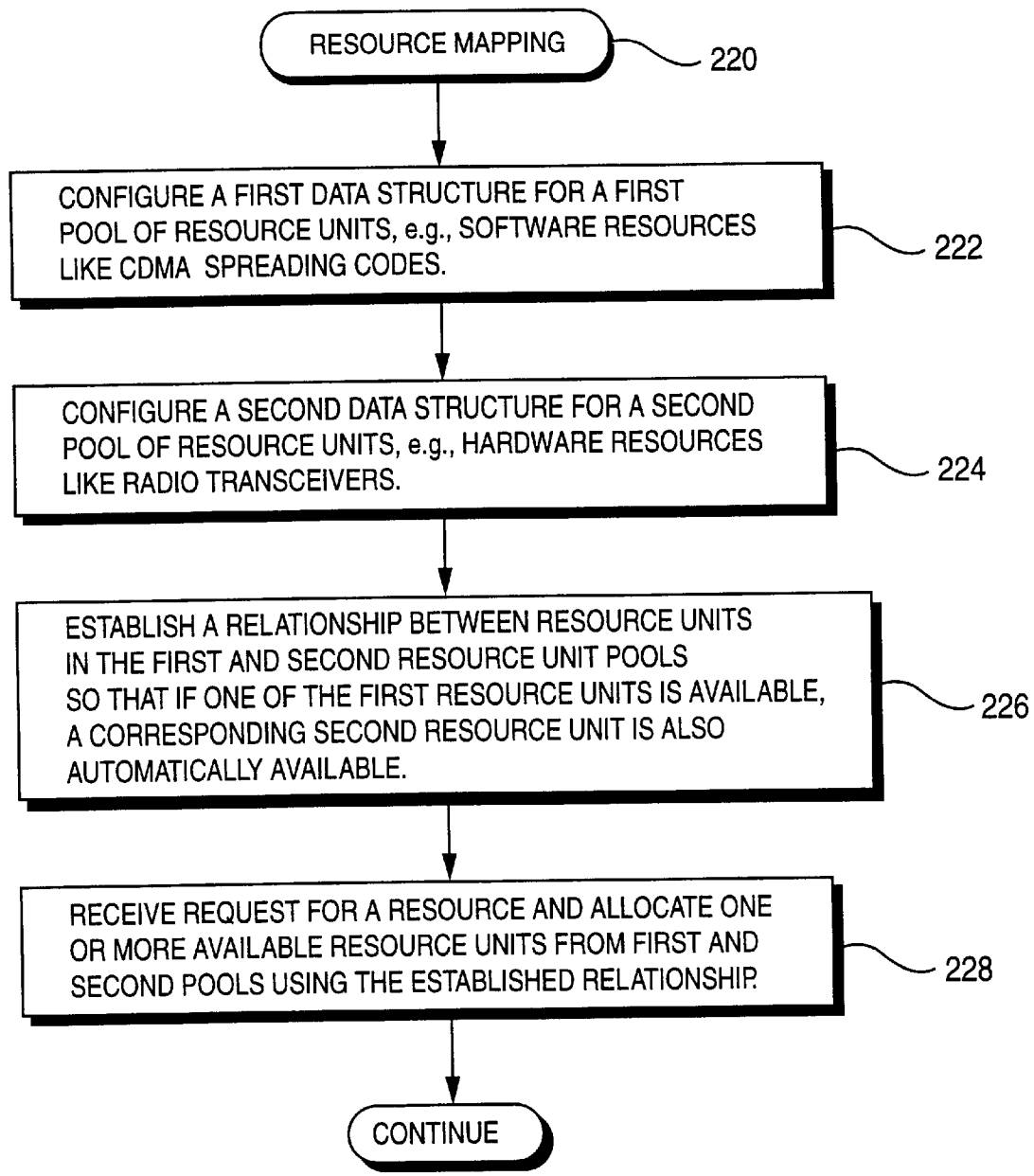
FIG. 11 is a flowchart diagram illustrating an example set of procedures for mapping resource units of different types in accordance with an example embodiment of the present invention.

Referring now to the resource mapping routine (block 220), in FIG. 11 which may be employed by the resource handler 200, a first data structure is configured for a first pool of resource units, e.g., software resources like CDMA spreading codes (block 222). A second data structure is configured for a second pool of resources, e.g., hardware resources like radio transceivers (block 224). A relationship is then established between resource units in the first and second resource unit pools so that if one of the resource units from the first pool is available, a corresponding resource unit from the second pool is also automatically available (block 226). Because of this relationship, there only needs to be one resource unit allocation procedure to coordinate and efficiently allocate resource units from two (or more) resource pools that are required to satisfy a specific request (block 228).

Figure 12:
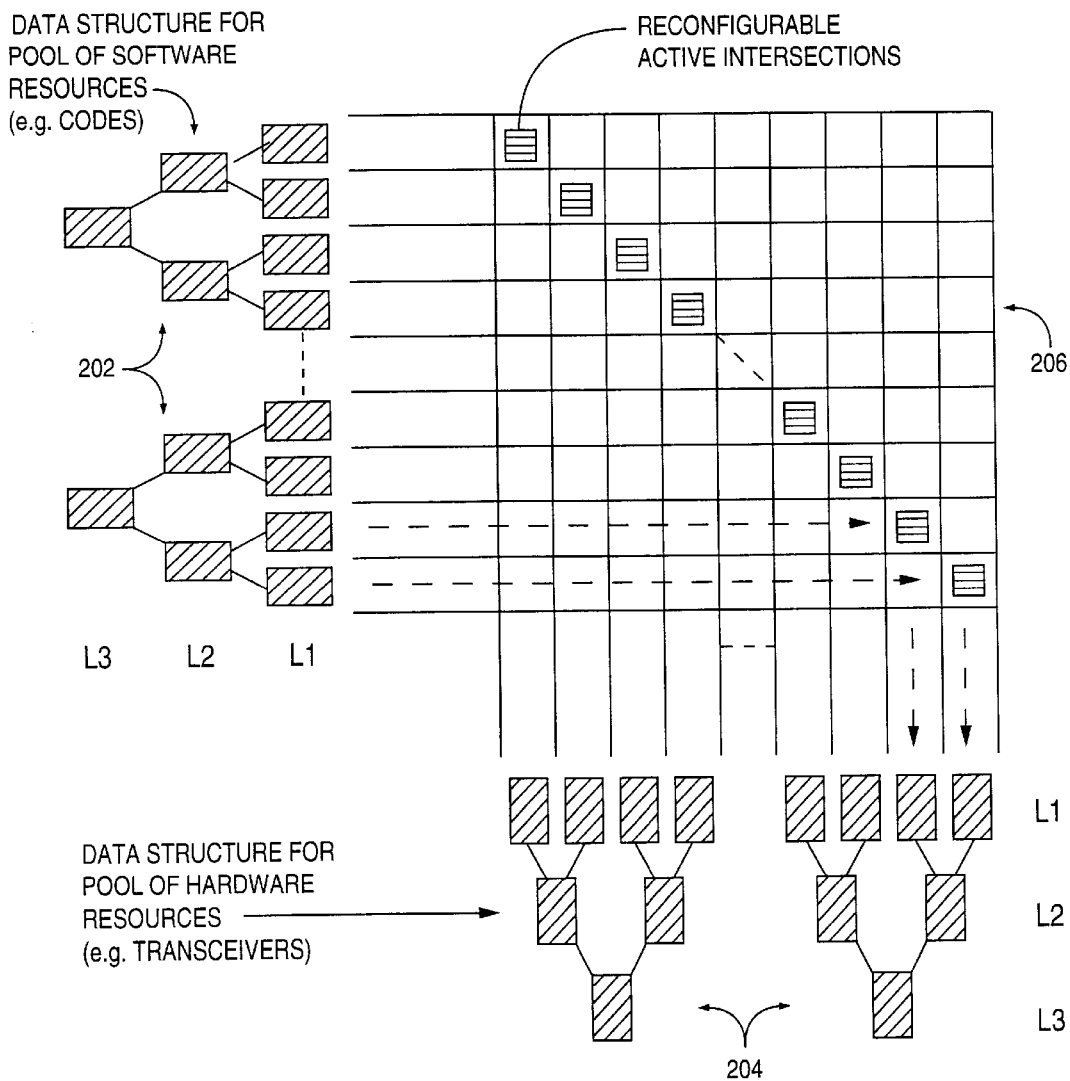
FIG. 12 is a diagram illustrating example hierarchical type data structures for first and second resource pools which are related is together by way of a reconfigurable resource mapping matrix.

FIG. 12 shows an example implementation of a mapper 206 as a matrix preferably implemented in software. The first data structure 202 is shown as a multi-level, hierarchical data structure of software resources like CDMA spreading codes. Data structure 204 is also shown as a multi-layer, hierarchical data structure of hardware resources like transceiver units. In this matrix implementation, the software resources correspond to rows of the matrix and the hardware resources correspond to columns. FIG. 12 shows a simple, example one-to-one correspondence in which each row resource unit is connected to (via an active intersection in the matrix structure) a single column resource unit. Active matrix intersections can be modified or reconfigured to accommodate changing needs, the addition of new resource units, or the removal of resource units. While a matrix is shown as an example mapping mechanism, those skilled in the art will appreciate that other mapping mechanisms may be employed.

While the invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method comprising the steps of:
   configuring a first data structure corresponding to a first pool of a first type of resource units including first, lowest level resource units of the first type provided in groups, and second, higher level resource units of the first type provided in groups, each corresponding to one of the groups of the first level resource units;
   configuring a second data structure corresponding to a second pool of a second type of resource units including first, lowest level resource units of the second type provided in groups, and second, higher level resource units of the second type provided in groups, each corresponding to one of the groups of the first level resource units of the second type;
   establishing a relationship between ones of the first type of resource units in the first data structure and ones of the second type of resource units in the second data structure;
   receiving a request for a resource that requires one or more resource units from the first and second pools of resource units; and
   using the established relationship to allocate available resource units from the first and second pools of resource units to respond to the request.

2. The method in claim 1, wherein the relationship includes a one-to-one correspondence between individual ones of the first and second types of resource units.

3. The method in claim 2, wherein each of the first and second data structures is configured as a hierarchy having plural levels.

4. A method comprising:
   configuring a first data structure corresponding to a first pool of a first type of resource units;
   configuring a second data structure corresponding to a second pool of a second type of resource units;
   establishing a relationship between ones of the first type of resource units in the first data structure and ones of the second type of resource units in the second data structure;
   receiving a request for a resource that requires one or more resource units from the first and second pools of resource units; and
   using the established relationship to allocate available resource units from the first and second pools of resource units to respond to the request,
   wherein the establishing step includes establishing a matrix, where each row in the matrix represents a resource unit of the first type and where each column represents a resource unit of the second type so that selection of a row or a column corresponding to a resource unit of one type also selects a column or row, respectively, corresponding to a resource unit of another type.

5. The method in claim 4, further comprising;
   configuring the matrix so that each row selects only one of the columns.

6. The method in claim 5, further comprising:
   reconfiguring the matrix.

7. The method in claim 1, wherein the first type of resource units are software resource units and the second type of resource units are hardware resource units.

8. A method for use in a code division multiple access CDMA communications system comprising:
   configuring a first data structure corresponding to a first pool of a first type of resource units including CDMA spreading codes;
   configuring a second data structure corresponding to a second pool of a second type of resource units including data processing and transceiving hardware;
   establishing a relationship between ones of the first type of resource units in the first data structure and ones of the second type of resource units in the second data structure;
   receiving a request for a resource that requires one or more resource units from the first and second pools of resource units; and
   using the established relationship to allocate available resource units from the first and second pools of resource units to respond to the request.

9. The method in claim 8, wherein each of the first and second data structures are hierarchies having plural levels, where plural resource units on a lower level are grouped to a corresponding single resource unit on a higher level such that all of the lower level resource units in the group must be available before the corresponding single resource unit on the higher level may be allocated.

10. The method in claim 8, wherein the relationship includes a one-to-one correspondence between individual ones of the first and second types of resource units.

11. A method comprising:
    storing a first structure for a first type of resource units;
    storing a second structure for a second type of resource units; and establishing a relationship between the first and second structures so that if one of the first type of resource units in the first structure is available for allocation, a corresponding second type of resource unit in the second structure is available for allocation, wherein the establishing step includes establishing a matrix where each row in the matrix represents one or more different resource units of the first type and where each column represents one or more different resource units of the second type so that selection of a row or a column corresponding to a resource unit of one type also selects a column or row, respectively, corresponding to a resource unit of another type.

12. Apparatus comprising:

means for storing a first data structure corresponding to a first pool of a first type of resource units and a second data structure corresponding to a second pool of a second type of resource units, wherein the first pool of resource units includes first, lowest level resource units of the first type provided in groups, and second, higher level resource units of the first type provided in groups, each corresponding to one of the groups of the first level resource units and the second pool of resource units includes first, lowest level resource units of the second type provided in groups, and second, higher level resource units of the second type provided in groups, each corresponding to one of the groups of the first level resource units of the second type;

means for establishing a relationship between ones of the first type of resource units in the first data structure and ones of the second type of resource units in the second data structure; and means, receiving a request for a resource that requires one or more resource units from the first and second pools of resource units, for using the established relationship to allocate available resource units from the first and second pools of resource units to respond to the request.

13. The apparatus in claim 12, wherein the relationship ensures that if one of the first type of resource units in the first pool is available for allocation, a corresponding second type of resource unit in the second pool is available for allocation.

14. The apparatus in claim 12, wherein the relationship includes a one-to-one correspondence between individual ones of the first and second types of resource units.

15. The apparatus in claim 12, wherein the first and second pools of resource units are hierarchical structures.

16. Apparatus comprising:

means for storing a first data structure corresponding to a first pool of a first type of resource units and a second data structure corresponding to a second pool of a second type of resource units;

means for establishing a relationship between ones of the first type of resource units in the first data structure and ones of the second type of resource units in the second data structure; and means, receiving a request for a resource that requires one or more resource units from the first and second pools of resource units, for using the established relationship to allocate available resource units from the first and second pools of resource units to respond to the request, wherein the means for establishing establishes a matrix where each row in the matrix represents a resource unit of the first type and where each column represents a resource unit of the second type so that selection of a row or a column corresponding to a resource unit of one type also selects a column or row, respectively, corresponding to a resource unit of another type.

17. The apparatus in claim 16, further comprising:
means for configuring the matrix so that each row selects only one of the columns.

18. The apparatus in claim 16, further comprising:
means for reconfiguring the matrix.

19. A communications system, comprising:

first and second pools of respective communications resource units, each pool configured in a hierarchical structure having plural levels;

a mapper that maps ones of the first pool of resource units to corresponding ones of the second pool of resource units;

a communications resource manager, in response to communication resource request, that allocates one or more of the resource units in the first pool, which also allocates the corresponding one or more of the resource units in the second pool based on the established mapping, wherein the mapper is configured to establish a matrix where each row in the matrix represents one or more different resource units in the first pool and where each column represents one or more different resource units in the second pool so that selection of a row or a column corresponding to a resource unit of one pool also selects a column or row, respectively, corresponding to a resource unit of the other pool.

20. The communications system in claim 19, wherein the first pool of resource units includes software resource units and the second pool of resource units includes hardware resource units.

21. A communications system, comprising:

first and second pools of respective communications resource units, each pool configured in a structure having plural levels;

a mapper that maps ones of the first pool of resource units to corresponding ones of the second pool of resource units;

a communications resource manager, in response to communication resource request, that allocates one or more of the resource units in the first pool, which also allocates the corresponding one or more of the resource units in the second pool based on the established mapping, wherein the communications system is a code division multiple access CDMA radio communications system, wherein the first pool of resource units are CDMA spreading codes and the second pool of resource units are data processing and transceiving hardware units.

22. The communications system in claim 21, wherein the mapper includes a matrix where each row in the matrix represents a different CDMA spreading code and where each column represents a different data processing and transceiving unit so that selection of a CDMA spreading code or a data processing and transceiving unit also selects a corresponding data processing and transceiving unit or CDMA spreading code, respectively.

23. The communications system in claim 22, wherein the mapper includes means for configuring the matrix so that each row is related to only one of the columns.

24. The communications system in claim 22, wherein the mapper includes means for reconfiguring the matrix.

25. The communications system in claim 19, wherein the mapper includes means for configuring the matrix so that each row is related to only one of the columns.

26. The communications system in claim 19, wherein the mapper includes means for reconfiguring the matrix.

* * * * *